(12) United States Patent
Brennan et al.

(10) Patent No.: US 7,704,392 B2
(45) Date of Patent: Apr. 27, 2010

(54) MINIMAL RESIDUAL LIQUID RETENTION FILTER HOUSING

(75) Inventors: Steven M. Brennan, Golden, CO (US); Edward Brennan, III, Federal Heights, CO (US); David DeBolt, Firestone, CO (US); Glenn Stocker, Longmont, CO (US); Michael Crowley, Boulder, CO (US)

(73) Assignee: MKS Instruments, Inc., Wilmington, MA (US)

( * ) Notice: Subject to any disclaimer, the term of this patent is extended or adjusted under 35 U.S.C. 154(b) by 299 days.

(21) Appl. No.: 12/016,838

(22) Filed: Jan. 18, 2008

(65) Prior Publication Data

US 2009/0184063 A1     Jul. 23, 2009

(51) Int. Cl.
   *B01D 27/08* (2006.01)
   *B01D 35/16* (2006.01)
(52) U.S. Cl. .................. 210/232; 210/248; 210/443; 210/450

(58) Field of Classification Search .................. 210/232, 210/248, 443, 450
See application file for complete search history.

(56) References Cited

U.S. PATENT DOCUMENTS

| 3,880,757  | A  | * | 4/1975  | Thomason ............. 210/167.28 |
| 4,028,254  | A  | * | 6/1977  | Shufflebarger et al. ...... 210/447 |
| 4,120,794  | A  | * | 10/1978 | Taylor ........................ 210/345 |
| 4,728,421  | A  | * | 3/1988  | Moddemeyer .............. 210/232 |
| 5,601,713  | A  | * | 2/1997  | Mayeaux et al. ............ 210/426 |
| 6,372,133  | B1 | * | 4/2002  | von der Hardt et al. ..... 210/232 |

FOREIGN PATENT DOCUMENTS

DE       4330839 A1 *  3/1995
FR       2823683 A1 * 10/2002

* cited by examiner

*Primary Examiner*—Thomas M Lithgow
(74) *Attorney, Agent, or Firm*—Cochran Freund & Young LLC; James. R. Young

(57) ABSTRACT

A filter housing with a socket drain for minimizing waste and downstream contamination of valuable fluids during filter element changes.

17 Claims, 12 Drawing Sheets

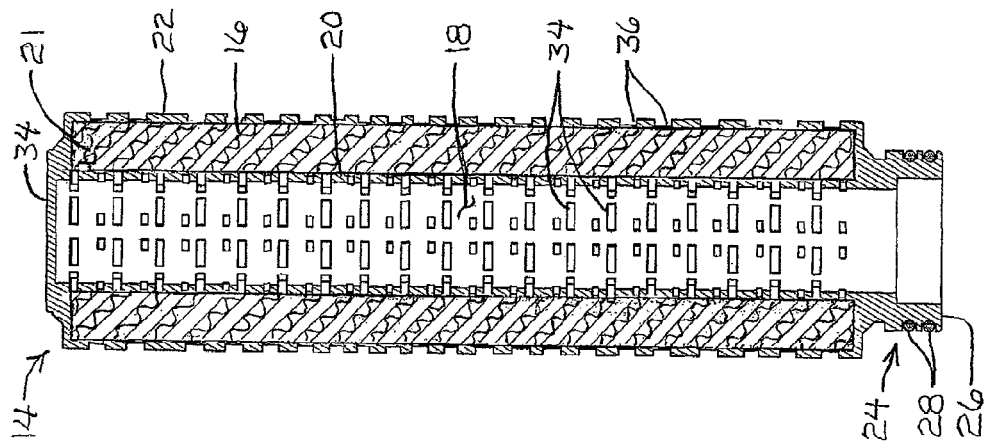
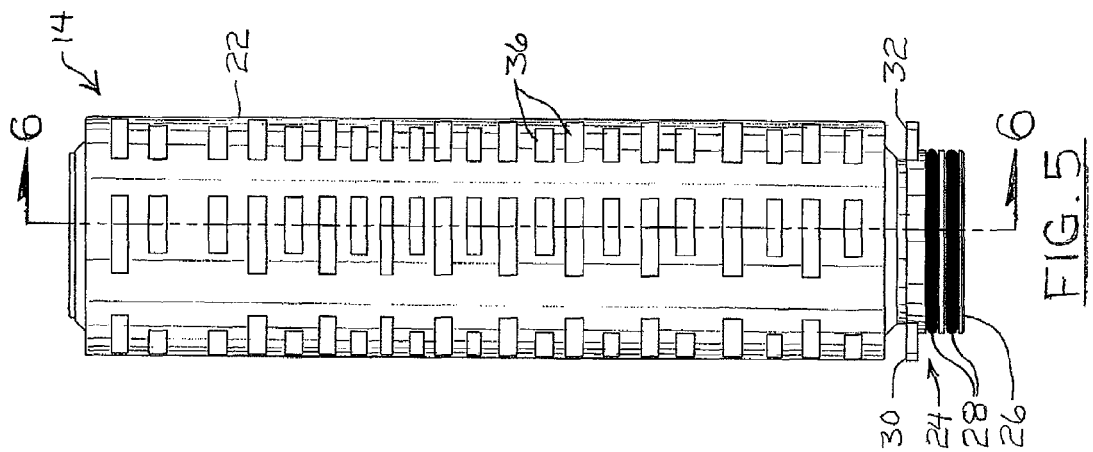
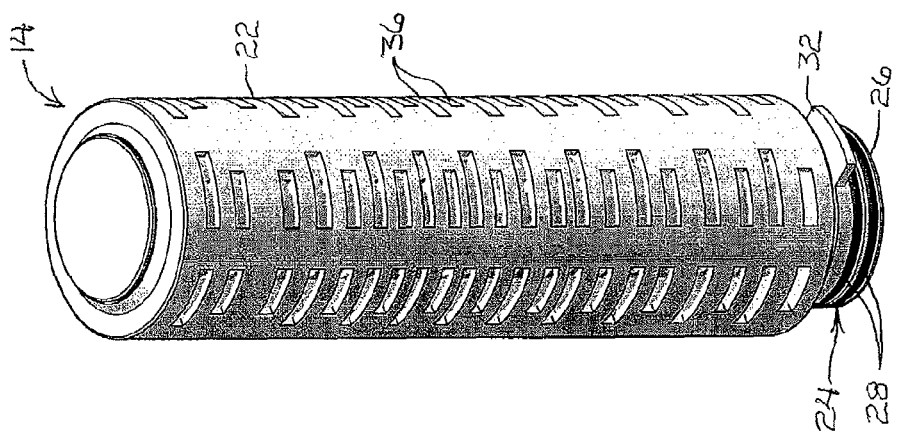

MINIMAL RESIDUAL LIQUID RETENTION FILTER HOUSING

BACKGROUND OF THE INVENTION

1. Technical Field of the Invention

This invention is related to liquid filters and housings for such filters.

2. State of the Prior Art

Liquid filters are used to remove impurities and contaminants from liquids in many applications. In the bio-science and pharmaceutical industries, including biopharmaceutical research and manufacturing (sometimes referred to individually and collectively as "bio-pharmaceutical"), liquid filters are used at various stages of the manufacturing and purification processes to remove contaminants and impurities, including, for example, bio-contaminants, from the process product streams. Filter elements or cartridges with a variety of porosities made with a variety of materials are available for particular applications and filtering needs.

For very high purity applications, for example, final filtering to remove bio-contaminants from biopharmaceutical products, a liquid filter with a base configuration known in the bio-pharmaceutical industry as "code 7" is often specified and used. Code 7 filters are generally characterized by a base that comprises a tubular end piece with O-ring seals and fastening ears or flanges for insertion into a filter housing cavity for bayonet-style attachment, i.e., longitudinal insertion into position and then angular twist or rotation for securing in place.

Such filters remain securely in place with leak-proof seals around the filter base to keep upstream, unfiltered liquid separated from downstream, filtered liquid during stream processing so that only liquid that has passed through the filter medium gets to the downstream side of the filter. However, in many high purity, bio-pharmaceutical systems, the filter cartridges have to be changed often, for example, between each batch process, and the act of changing the filter cartridges results in both potential contamination and waste due to residual, unfiltered, liquid product in the filter housing around the base of the filter cartridge that either drops into the downstream piping or is lost or discarded when the filter cartridge is removed from the housing. While the actual volume of such residual, unfiltered liquid is small, it is enough to cause undesirable contamination in piping and materials downstream from the filter, and it is very valuable at final or near final filter stages, so discarding such valuable material is expensive, especially when repeated after each process batch and for numerous filters in a final filter rack. The cumulative effect of such contamination and/or waste over a period of time is a significant enough problem in the bio-pharmaceutical industry that processors and filter equipment manufacturers have been trying for some time to find a cost-effective solution.

BRIEF DESCRIPTION OF THE DRAWINGS

The accompanying drawings, which are incorporated herein and form a part of the specification, illustrate some, but not the only or exclusive, example embodiments and/or features. It is intended that the embodiments and figures disclosed herein are to be considered illustrative rather than limiting.

In the drawings:

FIG. 4 is an isometric view of an example conventional filter element with a standard code 7 base configuration.

FIG. 5 is a side elevation view of the example filter element of FIG. 4.

FIG. 6 is a cross-section view of the filter element taken along section line 6-6 in FIG. 5.

DETAILED DESCRIPTION OF EXAMPLE EMBODIMENTS

Figure 1:
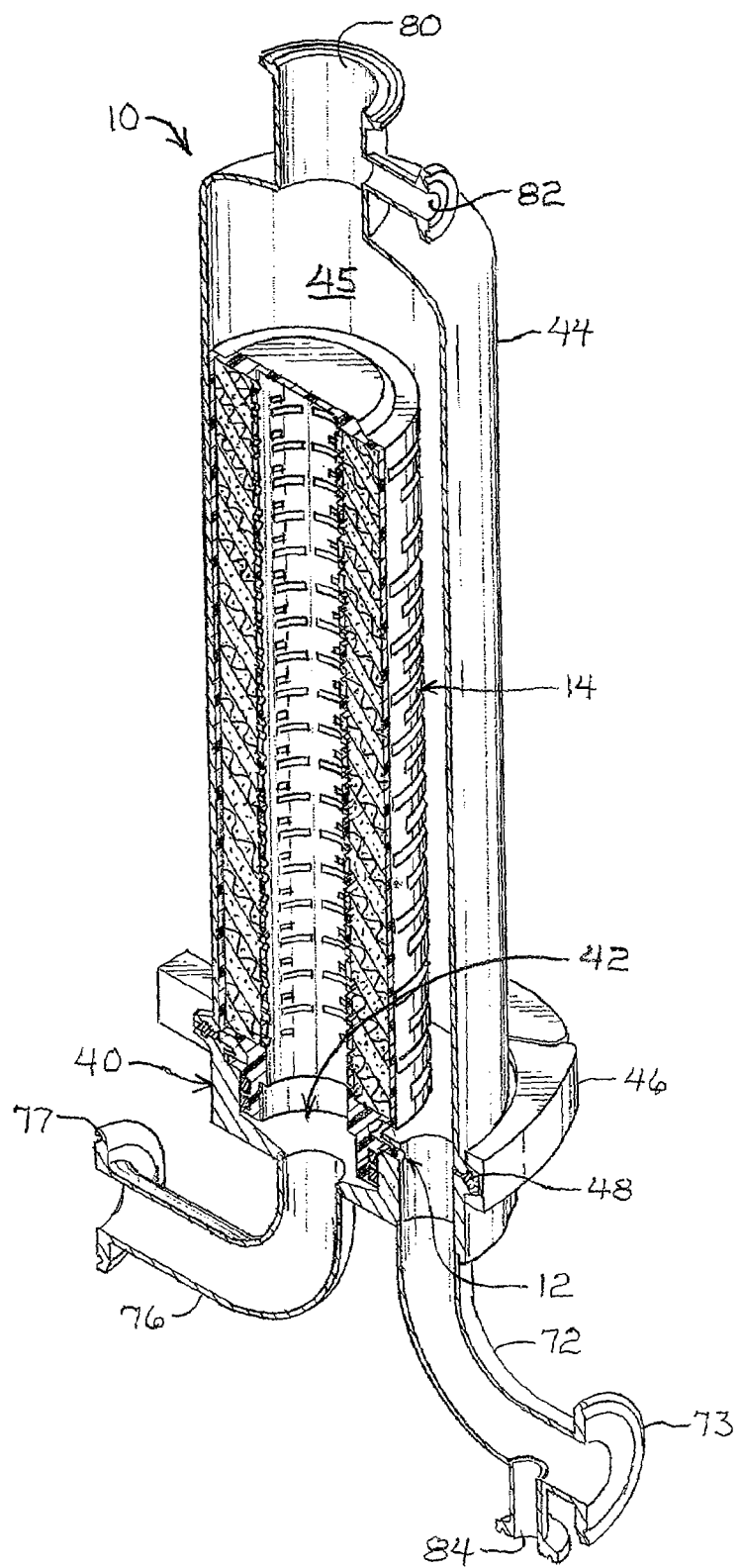
FIG. 1 is a cross-sectional isometric view of a filter housing with a socket drain as described below and with a standard filter element, also in cross-section, installed in the housing.
Figure 2:
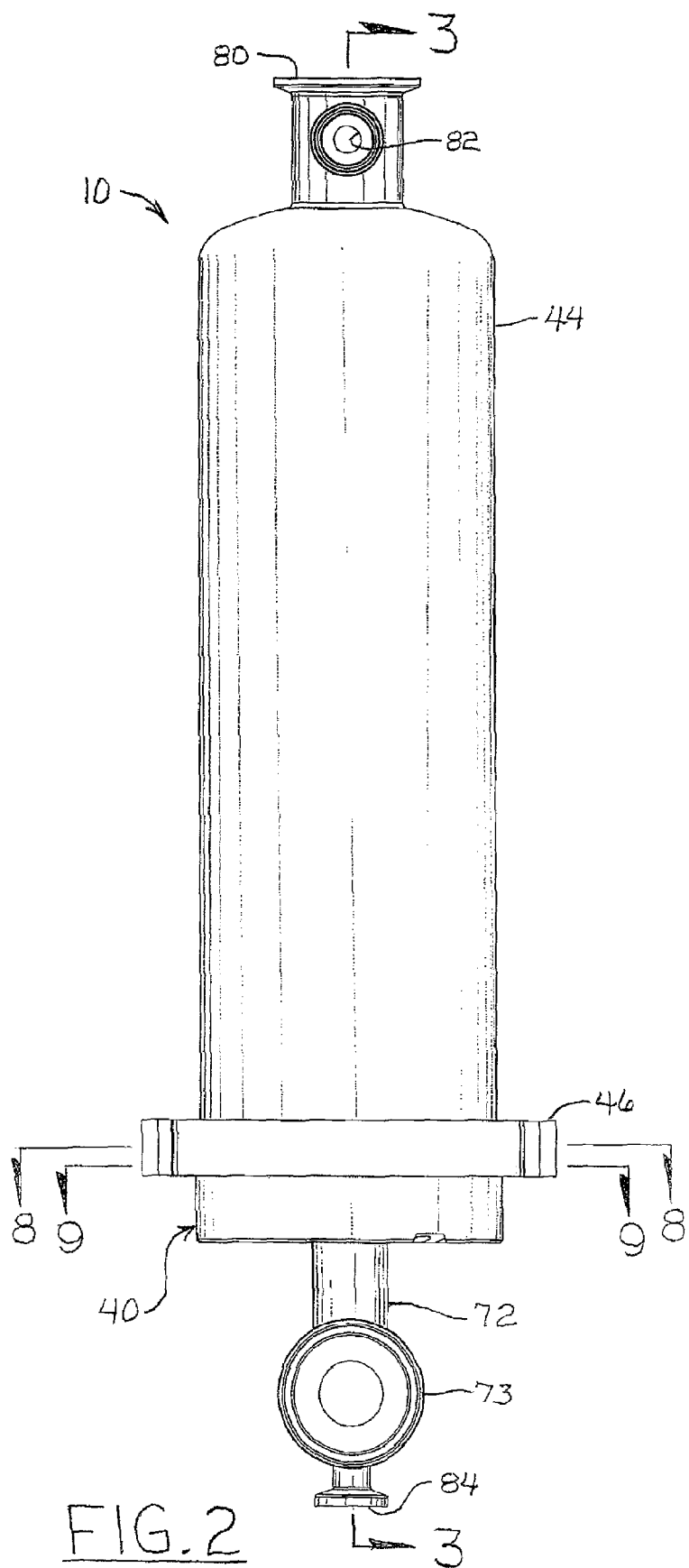
FIG. 2 is a side elevation view of the filter housing.

An example filter housing 10, which has an example socket drain 12, is shown in FIG. 1 with a filter element 14 installed in the housing 10 as an illustration of one example implementation of the invention, but recognizing that the invention recited in the claims below can also be implemented in myriad other ways, once the principles are understood from the description herein. This example implementation is shown in an isometric cross-section in FIG. 1 for visual convenience, whereas the side elevation view of the assembled filter housing 10 in FIG. 2 conceals the filter element 14 and socket drain 12, but FIG. 2 provides an orientation for the cross-sectional views 3-3, 8-8, and 9-9 in FIGS. 3, 8, and 9. The example filter element 14, which is also illustrated in FIGS. 4, 5, and 6, is a conventional bio-pharmaceutical filter element with a code 7 base configuration that is typically used in various stages of bio-pharmaceutical manufacturing and purification processes. Such filter elements are well known in the bio-pharmaceutical and other industries and are available from a variety of filter manufacturers with a variety of different filter medium 16 materials, porosities, and other characteristics for a variety of filter applications. Therefore, the filter element 14, itself, is not part of this invention, but it is shown herein to illustrate the problem solved by the socket drain 12, and, when it is installed in the filter housing 10, it interacts with the filter housing base plate 40 in a manner that minimizes, if not eliminates, contamination and waste problems, as will be explained in more detail below.

Figure 3:
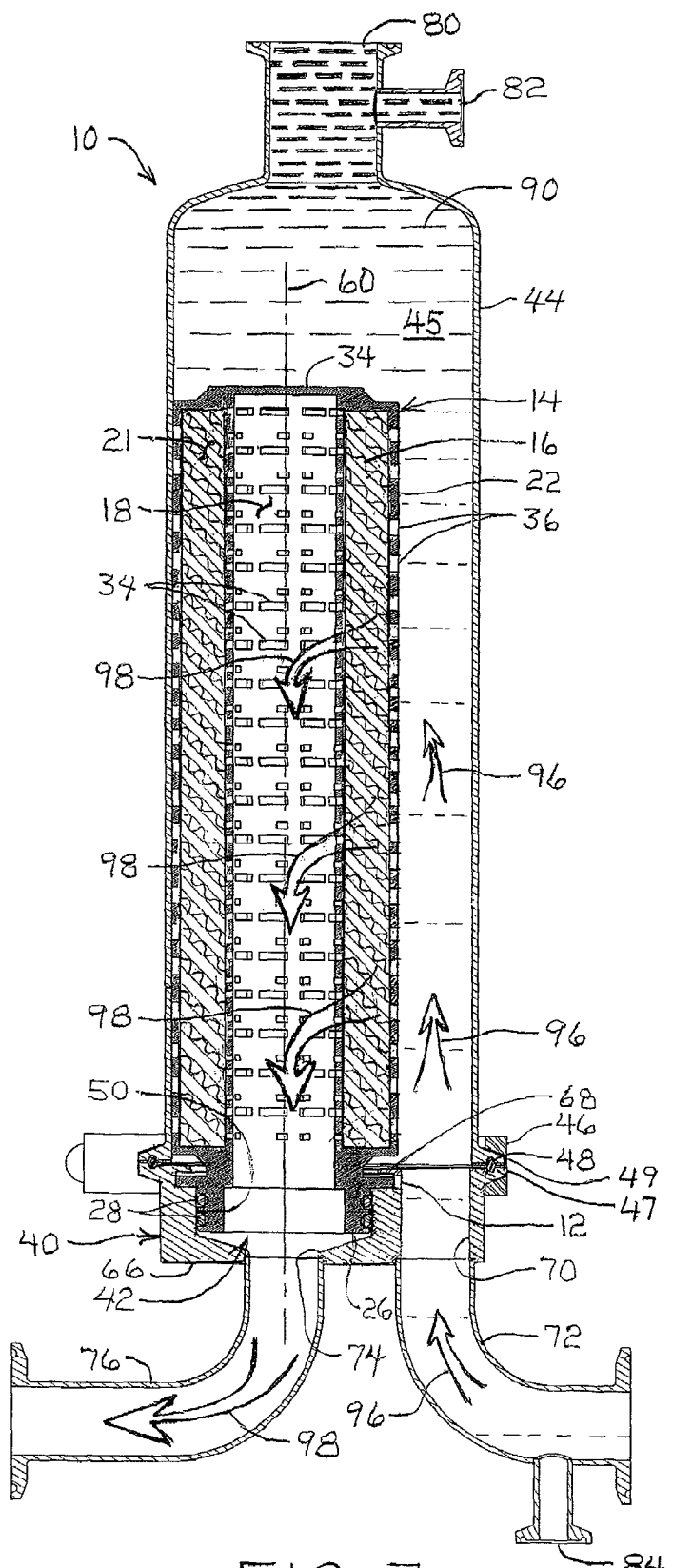
FIG. 3 is a cross-sectional view of the filter housing and installed filter element taken along section line 3-3 in FIG. 2.

Referring now primarily to FIG. 3, with secondary reference to FIGS. 1 and 4-6, the filter element 14 comprises a hollow core 18 defined by an interior core tube 20, which is surrounded by a filter medium 16 that is contained in an annular space 21 between the core tube 20 and an exterior, cylindrical casing 22 and that extends through a filter base 24 so that filtered liquid that that passed through the filter medium 16 can flow out of the filter element 14 through the filter element base 24. The core tube 20, casing 22, and filter medium 16 are supported by the filter element base 24, which is illustrated, for example, as a code 7 base, characterized by a tubular end piece or insert fitting 26 surrounded by O-ring seals 28 and a pair of radially protruding ears or key flanges 30, 32 for respectively sealing and securing the filter element 14 in the filter housing 10. Both the interior core tube 20 and the external casing 22 have a plurality of apertures 34, 36, respectively, to accommodate flowing a fluid from outside of the casing 22, through the filter medium 16, and into the hollow core 18 during use. An end cap 34 encloses the top ends of the hollow core 18 and annular space 21 so that, when the filter element 14 is installed in the filter housing 10, as will be described below, unfiltered liquid from outside the filter element 14 has to flow through the filter medium 16 to get from outside of the filter element 14 into the hollow core 18.

As shown in FIGS. 1-3, the filter housing 10 comprises a base plate 40 and a removable shell or enclosure 44 that together define and enclose a chamber 45. The base plate 40 has a socket 42 extending from the top surface 68 of the base plate 40 toward the bottom 66 of the base plate 40 for receiving and retaining the base 24 of the filter element 14. The shell 44 is mounted in a removable manner on the top of base plate 40 to cover and enclose the filter element 14 in the chamber 45 during use. The shell 44 can be fastened in any convenient or conventional manner, such as, for example, a conventional ring clamp mounted and tightened onto mating annular flanges 47, 49 on the base plate 40 and shell 44, respectively. A gasket 48 sandwiched between the flanges 47, 49 seals the shell 44 to the base plate 40 to prevent leakage of liquid from the chamber 45 during use. The shell 44 can be removed easily from the base plate 40 by removing the clamp 46 in order to access and change the filter element 14. Of course, other conventional mechanical devices or methods known to persons skilled in the art can be used instead of the clamp 46 to removably fasten the shell 44 on the base plate 40.

Figure 7:
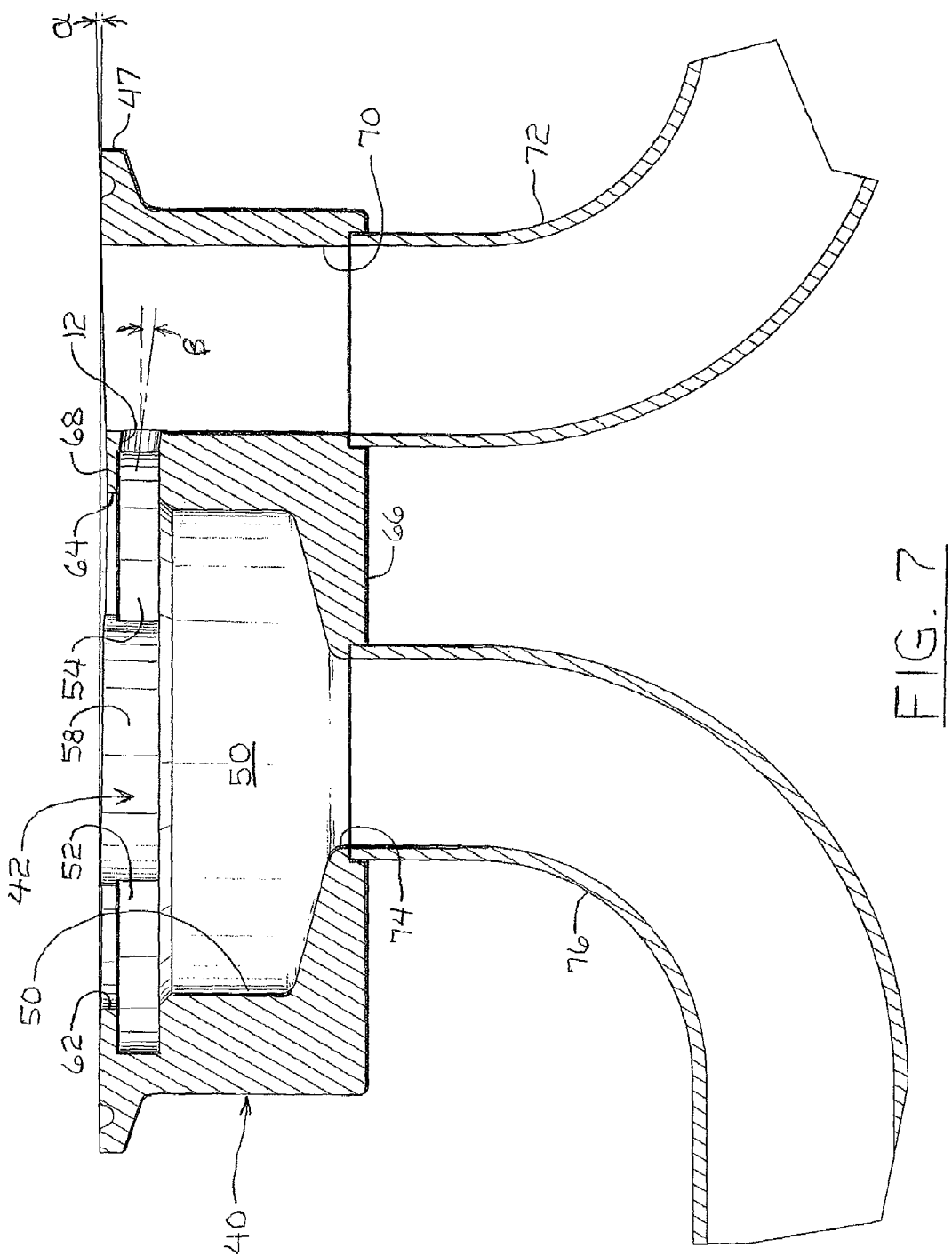
FIG. 7 is an enlarged cross-section view of the base plate of the filter housing in the same orientation as FIG. 3.

As best seen in FIGS. 1, 3, and 7, the socket 42 includes a socket cavity 50 into which the insert fitting 26 with the O-ring seals 28 of the filter element 14 is inserted to install the filter element 14 in the filter housing 10. Now referring also to FIGS. 8 and 9 in combination with FIGS. 1, 3, and 7, the socket 42 in base plate 40 also has one or more annular keyway grooves 52, 54 extending outwardly most or all of the distance around the cavity 50 at a distance spaced under the top surface 68 of the base plate 40. A pair of radially outwardly extending insert slots 56, 58 are shown at diametrically opposite sides of the socket 42, although one, three, or more of such slots could be used. The insert slots 56, 58 shown in FIGS. 1, 3, and 7-9 open from the top surface 68 into the keyway grooves 52, 54, respectively.

Figure 8:
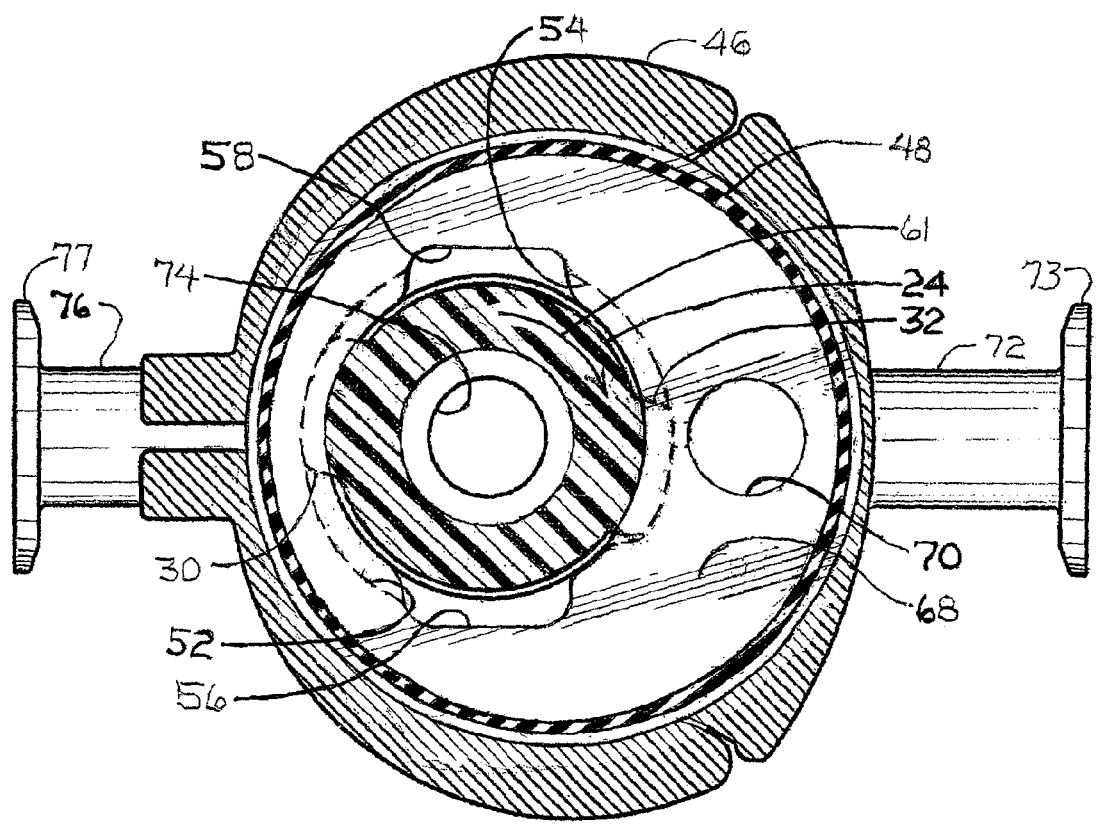
FIG. 8 is an enlarged cross-section view of the filter housing and filter element base taken along section line 8-8 in FIG. 3.
Figure 9:
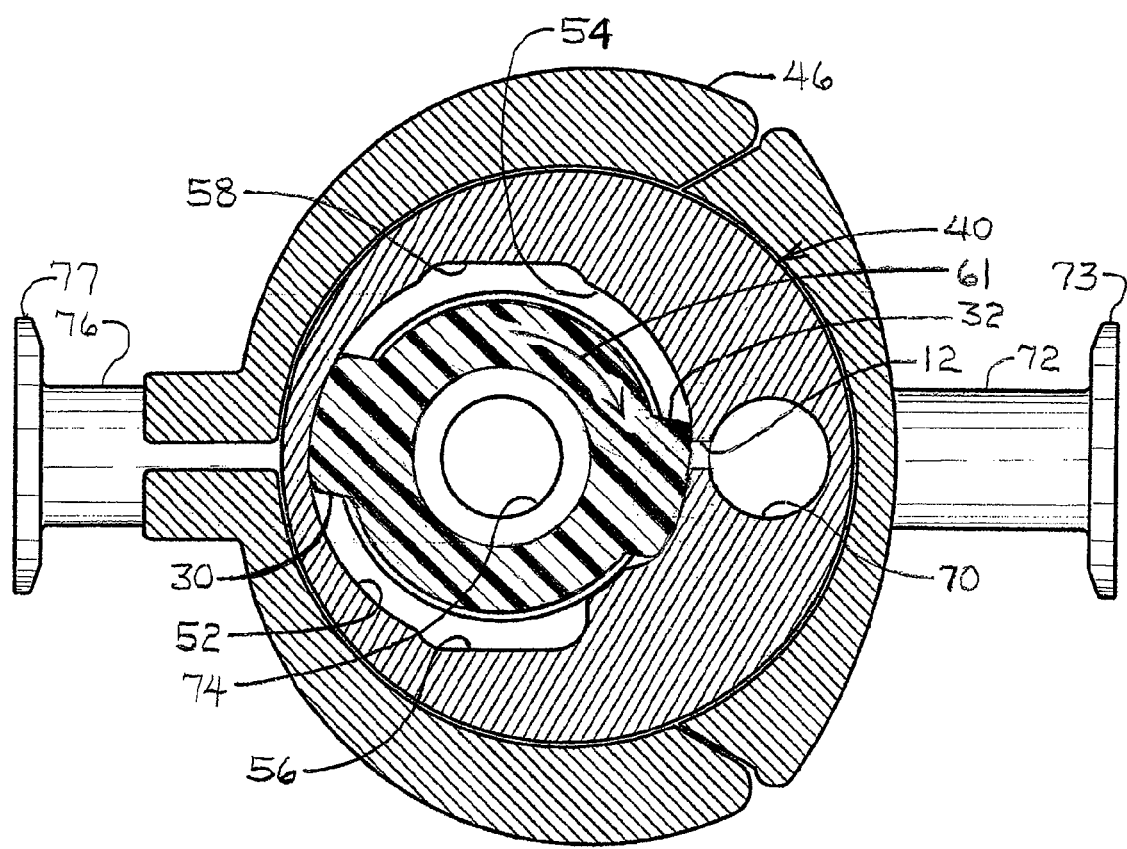
FIG. 9 is an enlarged cross-section view of the filter housing and filter element base taken along section line 9-9 in FIG. 3.
Figure 10:
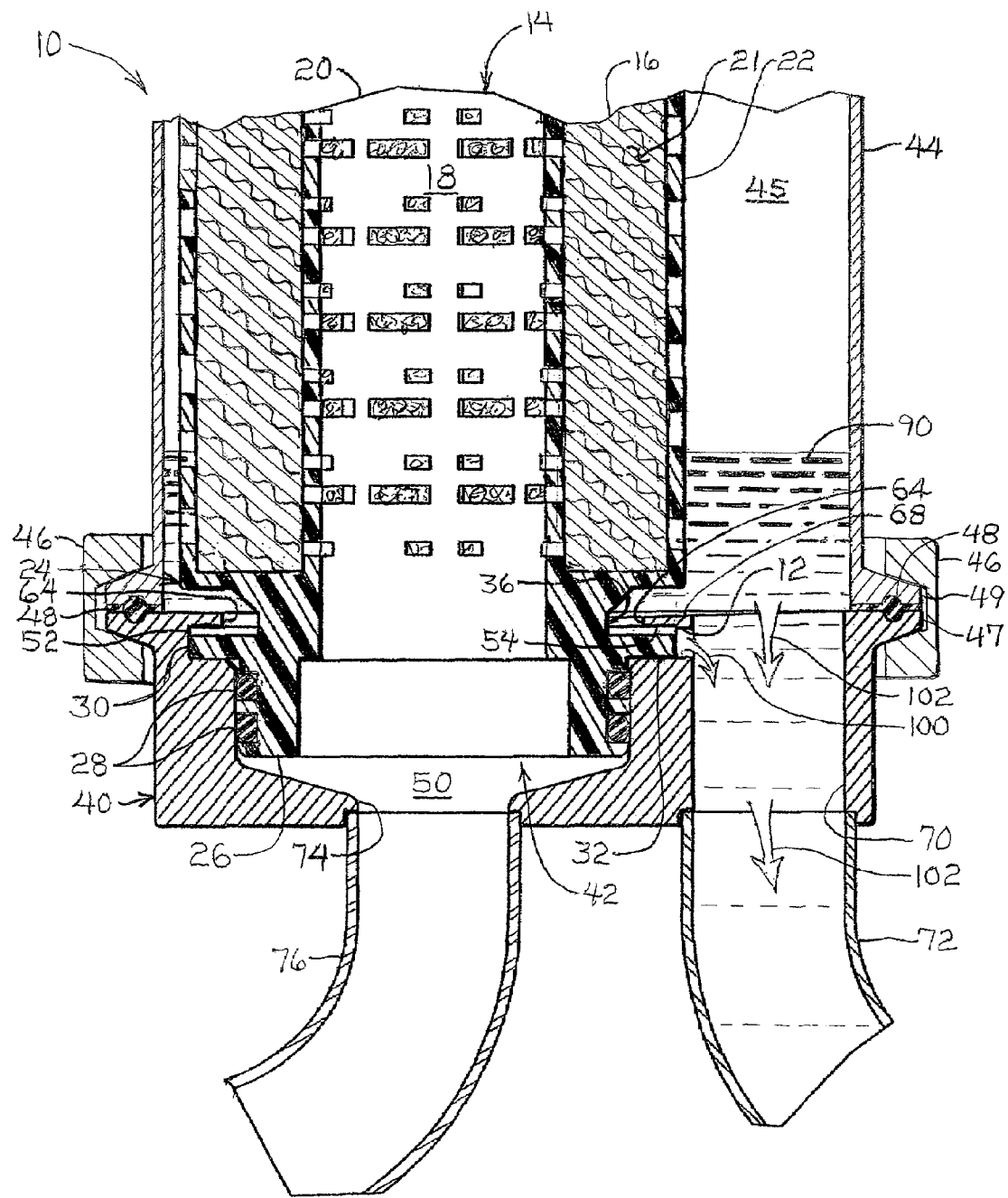
FIG. 10 is an enlarged cross-section view of the lower portion of the filter housing with the filter element installed.

To install the filter element 14 in the base plate 40, the filter element 14 is positioned over the bayonet socket 42 in the base plate 40 with the key flanges 30, 32 of the mating bayonet base 24 of the filter element 14 aligned with the insert slots 56, 58, and then the filter element 14 is pushed downwardly to force the insert fitting 26 with O-rings 28 into the socket cavity 50 until the flanges 30, 32 seat in the keyway grooves 52, 54, respectively. Then the filter element 14 is twisted or rotated about its longitudinal axis 60, as indicated by arrow 61 in FIGS. 8 and 9, to rotate the flanges 30, 32 in the keyway grooves 52, 54 to positions under the annular lips 62, 64 to secure the bayonet base 24 of the filter element 14 in the socket 42 of the base plate 40, as best seen in FIGS. 8-10. With the base 24 of the filter element 14 inserted and secured in the socket 42, the shell 44 can be replaced onto the base plate 40 and fastened along with the gasket 48 by the clamp 46 for use in filtering a liquid, as will be explained below.

As also shown in FIGS. 1-10, the base plate 40 has an inlet conduit 70 extending from the bottom 66 to the top surface 68 of the base plate 40 for conducting unfiltered fluid into the chamber 45 and an inlet pipe 72 attached around the inlet conduit 70 for use in connecting the filter housing 10 into a fluid flow or process system (not shown) to receive and conduct unfiltered liquid from such a system into the chamber 45. The base plate 40 also has an outlet aperture 74 extending from the cavity 50 to the bottom surface 66 and an outlet pipe 76 attached around the outlet aperture 74 for conducting filtered liquid away from the filter housing 10, for example, back into the fluid flow or process system (not shown) or to some other destination for the filtered liquid.

In a typical use, the inlet pipe 72 and outlet pipe 76 are connected via standard connectors 73, 77, respectively, into a fluid flow system (not shown), for example, a bio-pharmaceutical product process flow system. Likewise, in a typical use, the top port 80 is optional and may have a gauge (not shown) connected to it, and a typical setup may include a bleed valve or other device (not shown) connected to an optional lateral port 82, or one or both of those ports may simply be closed, plugged, or simply not provided. An optional bottom drain port 84 extending out of inlet pipe 72 may be provided to facilitate draining pre-filtered product out of the chamber 45 before removing the shell 44 for changing the filter element 14, so a suitable drain valve or other device (not shown) may be connected to the bottom drain port 84. However, any other piping and/or valve arrangement can be used to drain liquid out of the chamber 45 before removing the shell 44. In any event, the ports 80, 82, 84 are normally closed with some device, valve, fitting, or plug during filtering operations or simply not provided, so that the chamber 45 fills or substantially fills with liquid 90 to be filtered, as illustrated in FIG. 3. Also in FIG. 3, in-flow arrows 96 indicate the flow of unfiltered liquid from the inlet pipe 72 into the chamber 45, and the out-flow arrows 98 indicate the flow of liquid through the filter medium 16, down the hollow core 18 through the insert fitting 26, and out through the outlet pipe 76.

When it is time to change the filter element 14, for example, after each process batch, the in-flow 96 is stopped, and the liquid in the unfiltered liquid 90 in the chamber 45 can be removed in any convenient manner, for example, by opening a drain valve (not shown) connected to the drain port 84 in order to capture and collect such unfiltered liquid for later processing, for example, in a subsequent batch. The decreasing level of the liquid 90 and flow arrows 102 in FIG. 10 illustrate such drainage of unfiltered liquid 90 out of the chamber 45 in order to remove the shell 44 and change the filter element 14.

As best seen in FIGS. 7 and 10, the base plate 40 has an example socket drain hole 12 extending from the socket 42, for example, from the keyway groove 54 in socket 42, to the inlet conduit 70. Also, as best seen in FIG. 7, but also visible in FIG. 10, the top surface 68 of the base plate 40 is optionally sloped from the perimeter toward the socket 42. In the example in FIG. 7, the slope of the top surface 68 toward the socket 42 is indicated by the angle α. Therefore, as the unfiltered liquid 90 drains out of the chamber 45, as indicated by flow arrows 102 in FIG. 10, unfiltered liquid also flows from the spaces in the socket 42 above the O-rings 28, for example, from the keyway grooves 52, 54 and insert slots 56, 58 (FIGS. 8 and 9) as well as from the annular space between the external surface 36 of the filter base 24 and the lips 62, 64 of the base plate 40 (FIG. 10), through the socket drain hole 12, and into the inlet conduit 70, as indicated by the flow arrow 100. From the inlet conduit 70, the unfiltered liquid can flow out of the base plate 40. Also, the optional sloped top surface 68 encourages unfiltered liquid on the top surface 68 to flow into the socket 42, from where it then drains via the socket drain 12 into inlet conduit 70, as explained above, instead of pooling and remaining on the top surface 68, as will be explained below. Consequently, when all of the unfiltered liquid is drained out of the inlet conduit 70, the unfiltered liquid on the top surface 68 as well as that in the spaces in the socket 42, including, for example, the keyway grooves 52, 54 and insert slots 56, 58 as well as around the external surface 36 of the filter element base 24, is also drained off the top surface 68 and out of those spaces. As a result, the filter element 14 can then be removed from the socket 42 without a significant amount of unfiltered fluid falling into the outlet pipe 76 and without losing or wasting that unfiltered liquid, which is a very beneficial advantage over prior art filter housings.

Figure 11:
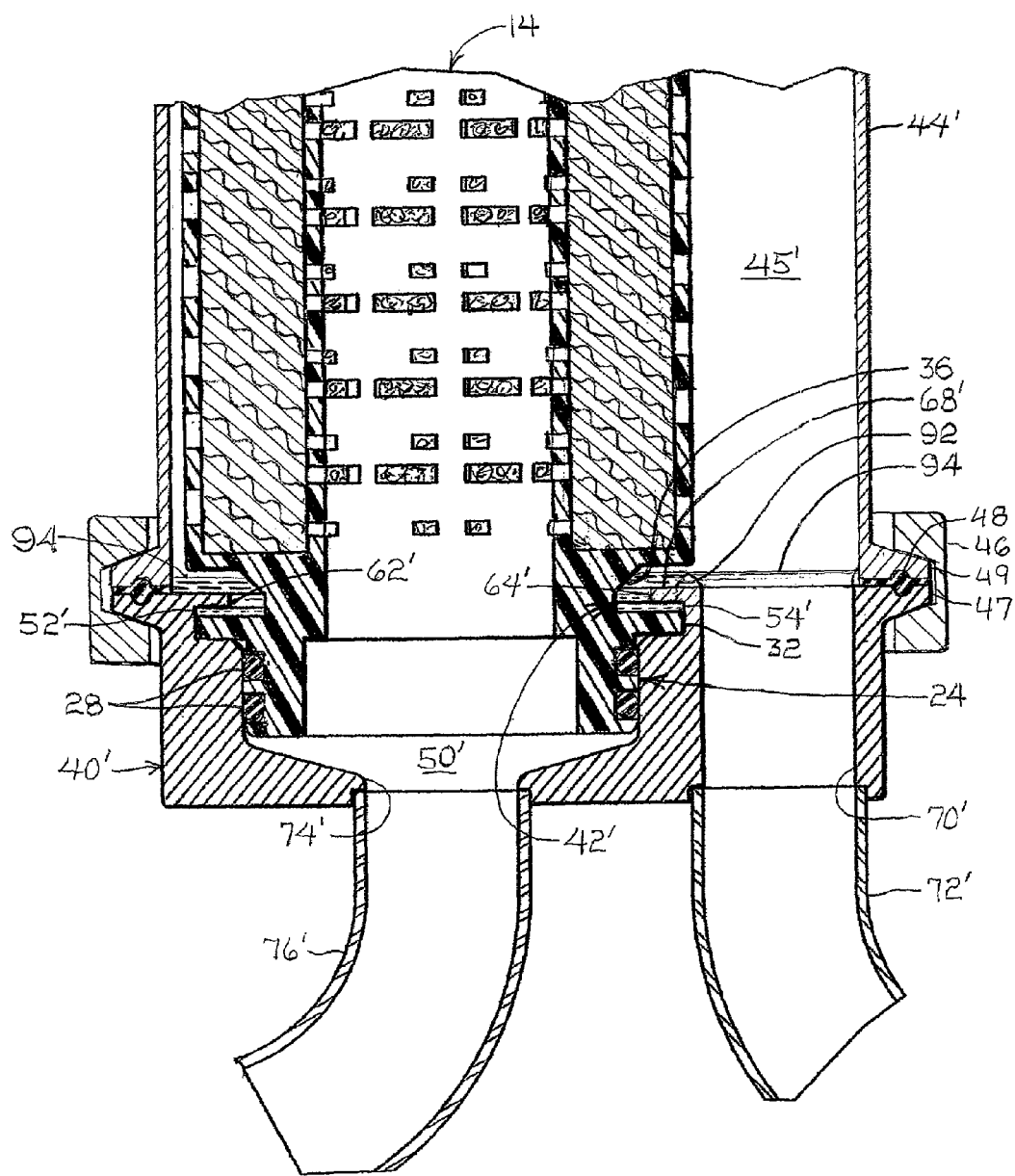
FIG. 11 is an enlarged cross-section view of a prior art filter housing illustrating an example liquid pooling problem.

To illustrate this advantage, the socket draining feature of FIG. 10, exemplified by the example socket drain 12 and thorough drainage from the top surface 68 and spaces in the socket 42 as explained above, can be contrasted to the prior art base plate 40' shown in FIG. 11, which does not have either a socket drain or a sloped top surface. In the FIG. 11 illustration, as much of the unfiltered liquid as possible has been drained out of the chamber 45', but a residual amount 94 of the unfiltered liquid remains pooled on the top surface 68' and in the spaces in the socket 42' around the external surface 36 of the filter base 24. In fact, we found that a meniscus 92 of the liquid forms around the periphery of the inlet 70' opening at the top surface 68' of the prior art base plate 40' so that the pool of residual liquid 94 on the top surface 68' is usually, depending on surface tension characteristics of the particular liquid, in a range of, for example, 1-3 millimeters thick, which, along with the residual liquid in the socket 42 spaces around the outside surface 36 of the filter element base 24, is significant, especially when it is a very valuable, high purity, bio-pharmaceutical liquid in a process wherein the filter element 14 has to be changed after each process batch. When the base 24 of the filter element 14 is pulled out of the socket 42' of the prior art base plate 40' in the FIG. 11 example, most, if not substantially all, of that residual liquid 94 pooled in the socket 42' and on the top surface 68' is lost down the outlet pipe 76', where it can contaminate filtered liquid or pipes through which filtered liquid has to flow. Even if that pooled, unfiltered, residual liquid 94 on the top surface 68' and in the spaces in the socket 42' is sponged, blown out, or otherwise removed before pulling the filter element base 24 out of the socket 42' in order to prevent it from getting into the outlet pipe 76 and contaminating filtered liquid, such sponging, blowing out, or otherwise removing such residual liquid still results in the loss of a significant amount of what may be a very valuable liquid. Therefore, the ability to save that residual, unfiltered liquid by draining the socket spaces and base plate surface and not let it contaminate filtered liquid or piping for filtered liquid, as explained above and shown in FIG. 10, is a significant advantage over the prior art FIG. 11 structure.

Referring again primarily to FIGS. 7 and 10, the slope of the top surface 68 can optionally be sloped toward the socket 42 to encourage the liquid on the top surface 68 to run toward the socket 42 for draining away via the socket drain hole 12, as explained above. While the slope angle α (FIG. 7) is not critical, a slope angle in a range of, for example, but not for limitation, $0°<\alpha<10°$ is beneficial for this purpose. Also, since the edge of the top surface 68 at the entrance of the socket 42 is in close proximity to the external surface 36 of the filter element base 24, the liquid clings to that area of that surface 36 and adjacent surface areas of the socket 42 and top surface 68, resulting in an increase of the liquid's surface area. Liquids, having surface tension, constantly tend to minimize their surface area. When a force, such as gravity, acts on a drop, film, puddle, or pool of liquid in a manner that tends to increase or stretch its surface area, a point can be reached at which the surface tension is overcome and the liquid breaks into smaller "packets" to minimize or reduce its surface area. Such breaking point can be illustrated by Plateau-Rayleigh Instability. Since the liquid in the spaces of the socket 42 around the filter element base 24 above the seals 28 (hereinafter "socket spaces") and on the top surface 68 clings to the surfaces of those socket spaces, e.g., to the filter base surface 36 and the surfaces of the flanges 30, 32, grooves 52, 54, and lip 64, therefore increasing its surface area, the remaining liquid atop surface 68 that is not in contact with those surfaces, minimizes its surface area due to surface tension. As the liquid in the socket spaces escapes via the socket drain hole 12, the remaining fluid atop surface 68 is drawn toward and into the socket spaces and to the drain hole 12 rather than breaking apart due to "overstretching" to leave liquid puddled or pooled on the top surface 68. Therefore, liquid on the top surface 68 drains away with the liquid in the socket spaces instead of puddling and remaining on the top surface 68. As well, there is an interrelationship between angle of slope of the top surface 68, proximity of the adjacent surface 36 of the filter element base 24, and drainage of liquid off the top surface 68. The proximity of the socket surface area 36 is such that the liquid at the edge of the lip 64, where the top surface 68 meets the socket 42, stays together in continuous flow over the edge and into the socket spaces as the liquid drains out of the socket spaces, instead of breaking apart at the edge. Also, if the top surface 16 is sloped, the slope should be enough so that gravity encourages flow of liquid on the top surface 68 toward the edge where the top surface 68 meets the socket 42, but not so much that the liquid breaks apart on the top surface 68 to leave puddling or pooling on the top surface 68. Electropolishing the top surface 68 in order to minimize microscopic bumps and other surface irregularities that tend to retain liquid on the surface can also contribute to more thorough drainage of liquid from the top surface 68. As also shown in FIG. 7, the socket drain hole 12 can be sloped downwardly at some angle β, for example in a range of $0°21\ \beta<90°$, toward the inlet conduit 70, although such a slope is not essential.

Figure 12:
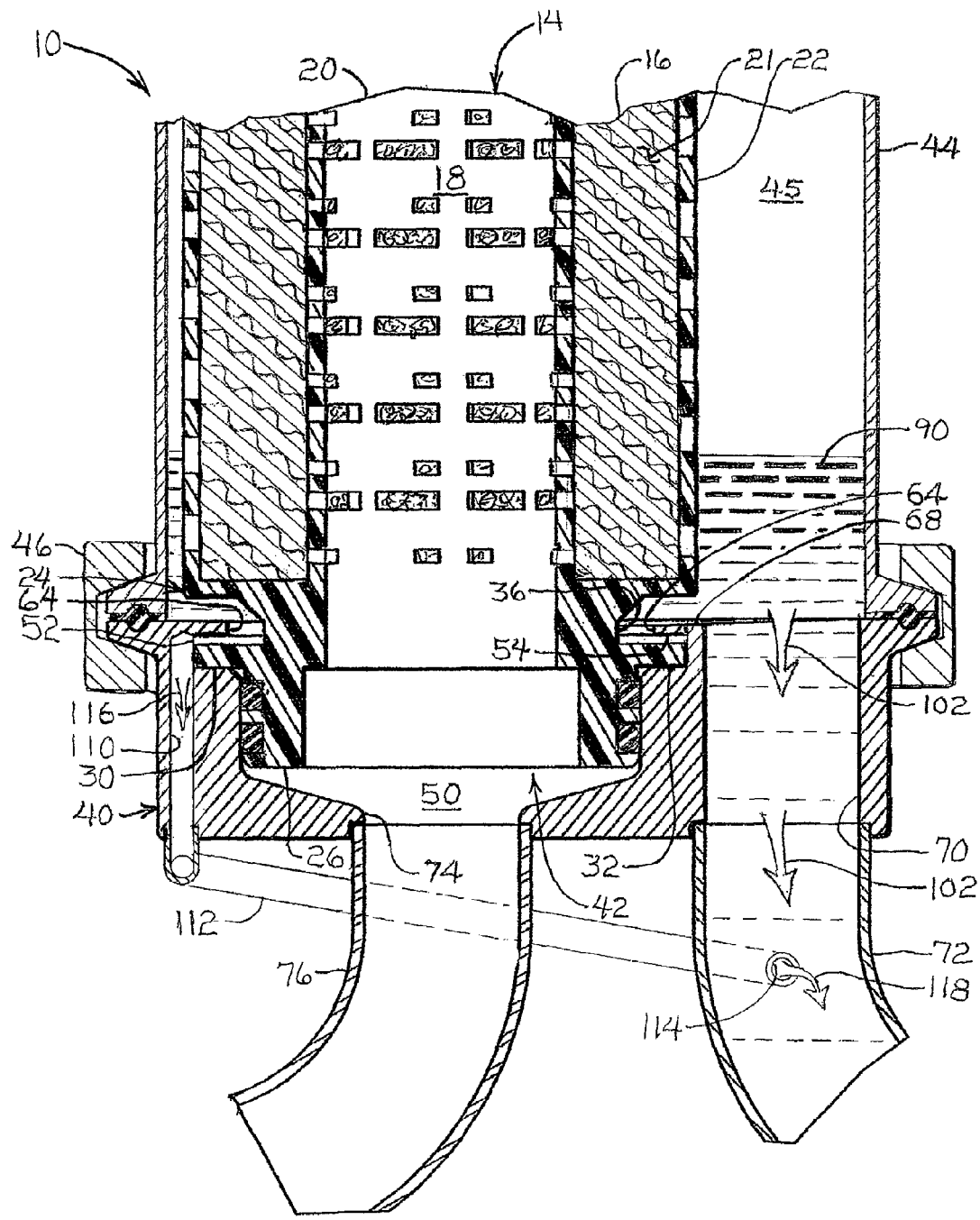
FIG. 12 is an enlarged cross-section view similar to FIG. 10, but with an example alternative implementation of the socket drain feature.
Figure 13:
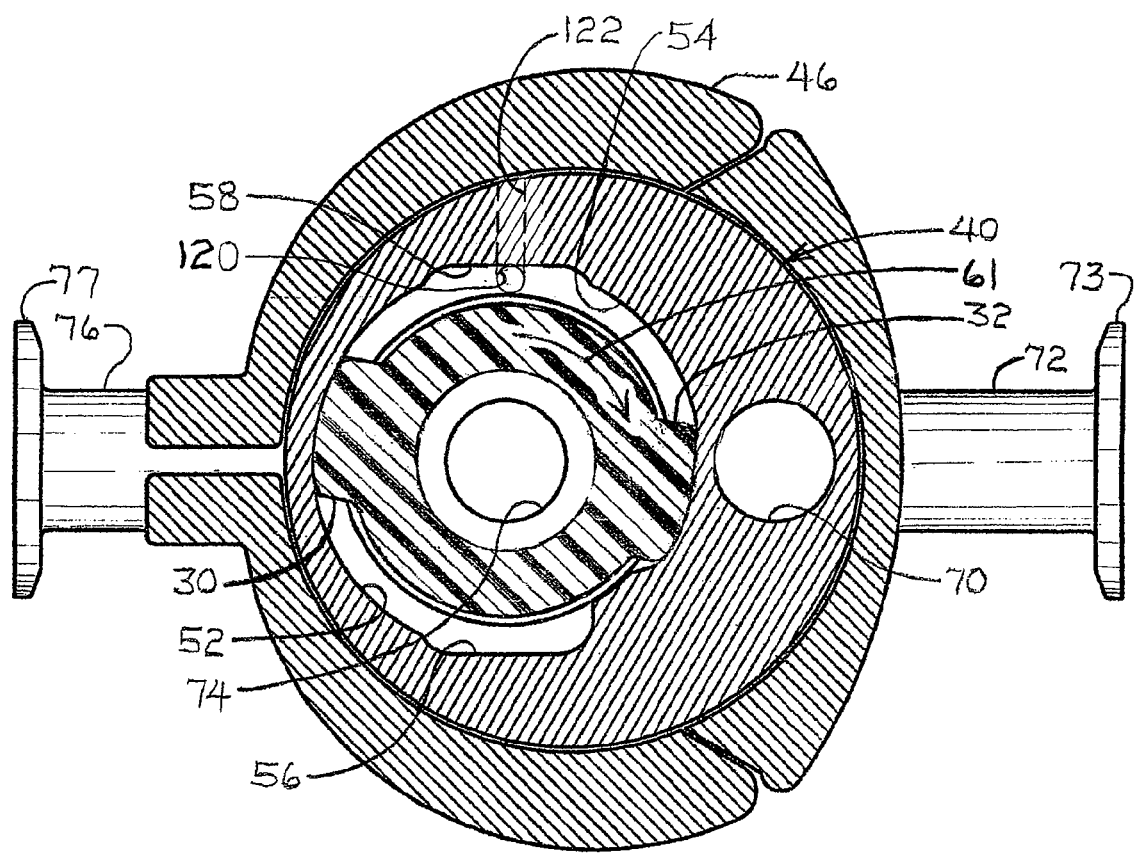
FIG. 13 is an enlarged cross-section view similar to FIG. 9, but with another example implementation of the socket drain feature.
Figure 14:
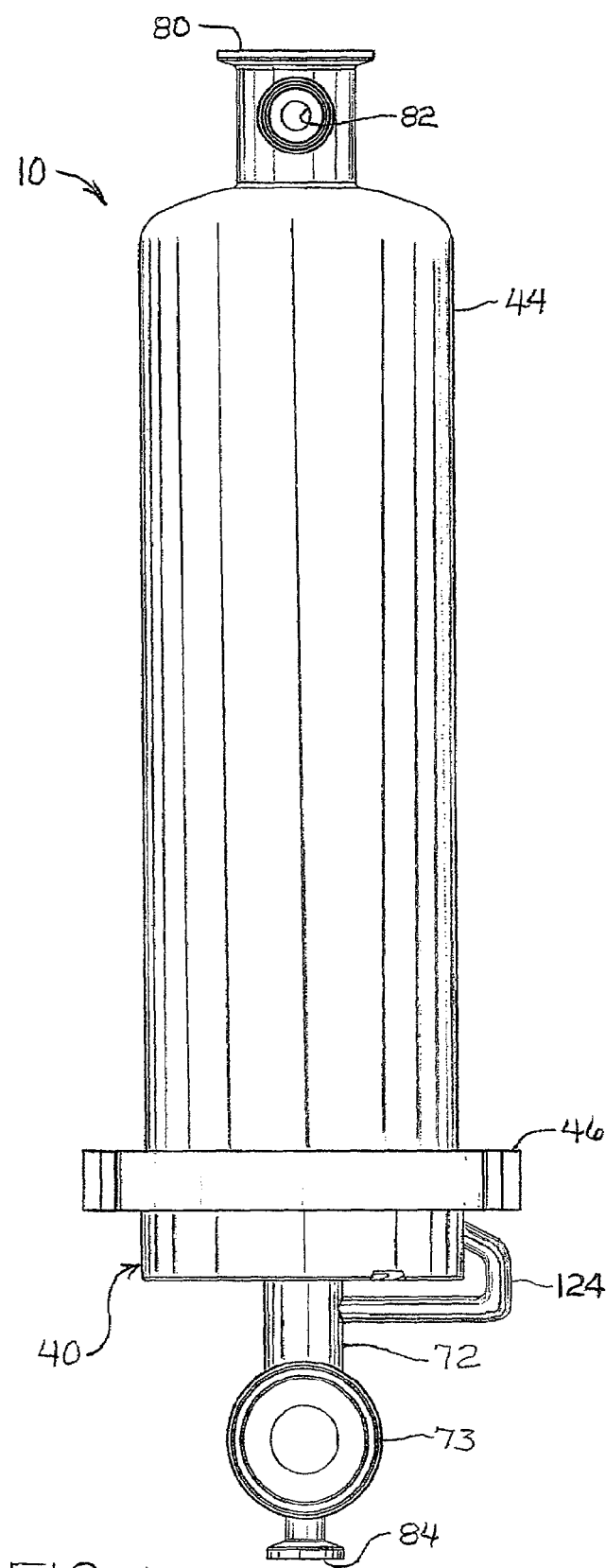
FIG. 14 is a side elevation view similar to FIG. 2, but illustrating the example implementation of the socket drain feature in FIG. 13.

While a number of example aspects and implementations have been discussed above, those of skill in the art will recognize certain modifications, permutations, additions and sub-combinations thereof. For example, but not for limitation, while the filter element 14 and socket 42 illustrated and described above is a code 7 base configuration, the socket drain and sloped surface can also be used with other filter base and socket configurations, such as codes 2, 3, 8, A, B, S, and others. Also, the socket drain can be implemented in other ways, once its purpose and function are understood, for example, but not for limitation, by the alternatives illustrated in FIGS. 12-14. In FIG. 12, an alternative socket drain duct 110 is shown extending from the keyway groove 52 to the bottom of the base plate 40 to drain unfiltered liquid from the socket spaces and surface 68 back into the inlet pipe 72 via an external conduit 112 and opening 114, as indicated by arrows 116, 118. In FIGS. 13 and 14, another alternative socket drain 120 from one of the slots 56, 58, for example, from slot 58 (FIG. 13), extending as indicated at 122 (FIG. 13) to a lateral side of the base plate 40, drains liquid from the socket spaces and top surface 68 to the inlet pipe 72 via an external conduit 124 (FIG. 14). Other routings of one or more socket drains from the socket spaces to the inlet conduit or inlet pipe could also be used. It is therefore intended that the following appended claims and claims hereafter introduced are interpreted to include all of these and other modifications, permutations, additions and sub-combinations as are within the spirit and scope of the claims.

The words "comprise," "comprises," "comprising," "composed," "composes," "composing," "include," "including," and "includes" when used in this specification, including the claims, are intended to specify the presence of stated features, integers, components, or steps, but they do not preclude the presence or addition of one or more other features, integers, components, steps, or groups thereof. Also, "unfiltered liquid" or "unfiltered fluid" as used herein indicates a liquid or fluid that has not passed through the filter medium of the filter element in the filter housing being described and does not mean that such fluid cannot have been filtered in some other filter, and "filtered liquid" or "filtered fluid" indicates liquid or fluid that has passed through the filter medium of the filter element in the filter housing being described. In other words, "unfiltered" indicates liquid or fluid upstream from the filter medium, and "filtered" indicates liquid or fluid downstream from the filter medium.

The invention and several embodiments in which an exclusive property or privilege is claimed are defined as follows:

1. Filter housing apparatus for receiving and retaining a filter element that has a filter medium and a filter base that has an insert fitting with a hollow core and an exterior seal, the filter housing apparatus comprising:
    a base plate with a top surface, a bottom surface, an inlet conduit extending between the bottom surface and the top surface, and a socket extending from the top surface toward the bottom surface to an outlet aperture, wherein the socket includes a cavity that is sized and shaped to receive the filter base and seal in a manner that places the hollow core of the filter element in fluid flow relation with the outlet aperture of the base plate and that seals a top portion of the socket above the seal and outside the filter base from a bottom portion of the socket below the seal so that fluid cannot flow from such top portion of the socket outside the filter base to the outlet aperture except through the filter medium and hollow core, and, further, wherein the base plate also has a socket drain extending between the top portion of the socket to the inlet conduit.

2. The filter housing of claim 1, wherein the top surface of the base plate is sloped toward the socket.

3. The filter housing of claim 1, wherein the proximity of the filter base is close enough to the top surface to prevent formation of a meniscus and separation of fluid on the top surface from fluid in the socket.

4. Filter housing apparatus for receiving and retaining a filter element that has a filter medium and a filter base that has an insert fitting with a hollow core and a exterior seal, the filter housing apparatus comprising:
    filter housing base means for supporting a removable shell to enclose a filter chamber and to support a filter element in the filter chamber, said filter base means including fluid inlet means for conducting unfiltered fluid into the chamber, fluid outlet means for conducting filtered fluid out of the chamber, and socket means for receiving and retaining the filter base in a manner that separates an upper portion of the socket means outside the filter element from a lower portion of the socket means and the outlet means such that unfiltered fluid in the chamber outside of the filter element has to flow through the filter medium to get to the fluid outlet means and cannot flow from the upper portion of the socket to the lower portion of the socket to get to the fluid outlet means, and wherein said filter housing base means also has socket drain means for draining the upper portion of the socket into the fluid inlet means.

5. The filter housing apparatus of claim 4, wherein the fluid inlet means includes an inlet conduit in the filter housing base means.

6. The filter housing apparatus of claim 5, wherein the fluid inlet means includes an inlet pipe connected to the inlet conduit.

7. The filter housing apparatus of claim 4, wherein the socket means includes a cavity extending from a top surface of the filter housing base means downwardly toward the fluid outlet means.

8. The filter housing apparatus of claim 7, wherein the socket means includes an annular keyway groove in the cavity spaced at a distance under the top surface with an annular lip between the top surface and the keyway groove.

9. The filter housing apparatus of claim 8, including an insert slot extending from the top surface to the keyway groove.

10. The filter housing apparatus of claim 8, wherein the socket drain means includes a socket drain conduit extending from the keyway groove to the fluid inlet means.

11. The filter housing apparatus of claim 10, wherein the socket drain conduit extends from the keyway groove to the inlet conduit.

12. The filter housing apparatus of claim 10, wherein the socket drain conduit extends from the keyway groove to the inlet pipe.

13. The filter housing apparatus of claim 9, wherein the socket drain means includes a socket drain conduit extending from the insert slot to the fluid inlet means.

14. The filter housing apparatus of claim 13, wherein the socket drain conduit extends from the insert slot to the inlet pipe.

15. The filter housing apparatus of claim 7, wherein the top surface is sloped toward the socket means.

16. The filter housing apparatus of claim 4, wherein the filter housing base means includes a base plate.

17. A method of operating a liquid filter, including:
    inserting a base of a filter element into a socket in a filter housing base plate that leads from a top surface of the base plate toward a fluid outlet aperture in such a manner that the base of the filter element seals in the socket to prevent liquid from flowing from an upper portion of the socket downwardly around the outside of the base of the filter element to the outlet aperture and in such a manner that a filter medium of the filter element extends above the top surface of the filter housing base plate to that liquid above the top surface outside of the filter element can flow through the filter medium, into a filter core that extends through the base of the filter toward the outlet aperture, and out of the outlet aperture;
    positioning a shell over the filter element and top surface of the base plate to enclose the filter element in a chamber and fastening and sealing the shell onto the base plate;
    flowing unfiltered liquid through an inlet pipe and inlet conduit into the chamber upstream from the filter medium, through the filter medium to filter the liquid, and out the outlet aperture;
    stopping the flow of unfiltered liquid into the chamber;
    draining the unfiltered liquid in the chamber out of the chamber through the inlet conduit and inlet pipe;

draining unfiltered liquid out of the upper portion of the socket through a drain conduit in the base plate extending from the upper portion of the socket to the inlet conduit and/or inlet pipe;

unfastening and removing the shell to access the filter element;

removing the filter element by pulling the base of the filter element out of the socket and inserting a base of another filter element into the socket in the filter housing base plate; and repeating the positioning of the shell, flowing of unfiltered liquid into the chamber and through the filter medium, stopping the flow of unfiltered liquid into the chamber, draining the unfiltered liquid out of the chamber, draining unfiltered liquid out of the upper portion of the chamber, unfastening and removing the shell, and removing the filter element.

* * * * *